(12) United States Patent
Kobayashi et al.

(10) Patent No.: US 11,515,063 B2
(45) Date of Patent: Nov. 29, 2022

(54) COMPOSITE CABLE

(71) Applicants: SUMITOMO WIRING SYSTEMS, LTD., Yokkaichi (JP); SUMITOMO ELECTRIC INDUSTRIES, LTD., Osaka (JP)

(72) Inventors: Kenta Kobayashi, Mei (JP); Akira Kitabata, Mie (JP); Takaya Kohori, Tochigi (JP); Masayuki Ishikawa, Tochigi (JP)

(73) Assignees: SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/483,935

(22) Filed: Sep. 24, 2021

(65) Prior Publication Data
US 2022/0013254 A1    Jan. 13, 2022

Related U.S. Application Data

(63) Continuation of application No. 16/603,541, filed as application No. PCT/JP2018/004237 on Feb. 7, 2018, now Pat. No. 11,133,121.

(30) Foreign Application Priority Data

Apr. 28, 2017    (JP) .............................. JP2017-090040

(51) Int. Cl.
*B60R 16/023*    (2006.01)
*B60R 16/03*    (2006.01)
(Continued)

(52) U.S. Cl.
CPC ........... *H01B 9/003* (2013.01); *B60R 16/023* (2013.01); *B60R 16/03* (2013.01); *H01B 7/18* (2013.01); *H01B 11/02* (2013.01)

(58) Field of Classification Search
CPC .......... H01B 9/003; H01B 7/18; H01B 11/02; B60R 16/023; B60R 16/03
(Continued)

(56) References Cited

U.S. PATENT DOCUMENTS 2,981,788 A    4/1961   Bunish
3,614,300 A *  10/1971  Wilson .................. H01B 7/182
                                                       174/115

(Continued)

FOREIGN PATENT DOCUMENTS

CN           1455416 A      11/2003
CN         102163475 A       8/2011
(Continued)

OTHER PUBLICATIONS

U.S. Appl. No. 16/603,530, filed Oct. 7, 2019 in the name of Kobayashi et al.
(Continued)

*Primary Examiner* — Timothy J Thompson
*Assistant Examiner* — Michael F McAllister
(74) *Attorney, Agent, or Firm* — Oliff PLC

(57) ABSTRACT

A composite cable that enables to easily restrain falling-off of separator dust at the time of peeling off a sheath, in comparison with composite cables in the conventional art. The composite cable includes a plurality of wires, a separator that covers the outer circumference of the plurality of wires all together, a sheath that covers the outer circumference of the separator, and an inclusion that is interposed between the separator and the sheath. The separator has a base layer composed of a polymer and an adhesive layer formed on the surface of the base layer on the inclusion side. In the composite cable, the adhesive layer is adhered to the inclusion.

9 Claims, 2 Drawing Sheets

(51) Int. Cl.
*H01B 7/18* (2006.01)
*H01B 11/02* (2006.01)
*H01B 9/00* (2006.01)

(58) Field of Classification Search
USPC .......................................................... 174/98
See application file for complete search history.

(56) References Cited

U.S. PATENT DOCUMENTS

| | | | |
|---|---|---|---|
| 4,374,299 A | 2/1983 | Kincaid | |
| 4,398,058 A | 8/1983 | Gerth et al. | |
| 5,107,076 A | 4/1992 | Bullock et al. | |
| 5,329,065 A * | 7/1994 | Marney | H01B 7/04 174/128.1 |
| 7,166,802 B2 | 1/2007 | Cusson et al. | |
| 7,297,873 B2 | 11/2007 | Grogl et al. | |
| 9,000,301 B2 | 4/2015 | Hayakawa et al. | |
| 9,463,756 B2 | 10/2016 | Hayakawa et al. | |
| 9,799,424 B2 | 10/2017 | Heipel et al. | |
| 9,862,336 B2 | 1/2018 | Hayakawa et al. | |
| 9,902,347 B2 | 2/2018 | Hayakawa et al. | |
| 9,905,338 B2 * | 2/2018 | Hashimoto | H01B 7/295 |
| 9,959,954 B1 | 5/2018 | Jackson et al. | |
| 10,002,689 B2 * | 6/2018 | Straniero | H01B 13/22 |
| 10,115,498 B2 | 10/2018 | Heipel et al. | |
| 10,279,756 B2 | 5/2019 | Hayakawa et al. | |
| 10,468,157 B2 | 11/2019 | Hashimoto et al. | |
| 2006/0021786 A1 | 2/2006 | Fetterolf et al. | |
| 2006/0029340 A1 * | 2/2006 | Andrews | G02B 6/447 385/100 |
| 2008/0190643 A1 | 8/2008 | Lumachi et al. | |
| 2010/0000759 A1 | 1/2010 | Lumachi et al. | |
| 2011/0200289 A1 | 8/2011 | Sorimachi et al. | |
| 2011/0278043 A1 | 11/2011 | Ueda et al. | |
| 2014/0096996 A1 * | 4/2014 | Sidlyarevich | H01B 7/04 156/50 |
| 2014/0262423 A1 | 9/2014 | Westrick, Jr. | |
| 2014/0326480 A1 | 11/2014 | Hashimoto et al. | |
| 2017/0302010 A1 | 10/2017 | Urashita et al. | |
| 2018/0025808 A1 | 1/2018 | Hashimoto et al. | |
| 2018/0281706 A1 | 10/2018 | Kobayashi | |
| 2019/0115213 A1 | 4/2019 | Hashimoto et al. | |
| 2019/0210543 A1 | 7/2019 | Hayakawa et al. | |
| 2020/0013525 A1 | 1/2020 | Hashimoto et al. | |
| 2021/0210251 A1 | 7/2021 | Hayakawa et al. | |

FOREIGN PATENT DOCUMENTS

| | | |
|---|---|---|
| CN | 203387021 U | 1/2014 |
| CN | 104134485 A | 11/2014 |
| CN | 204257229 U | 4/2015 |
| CN | 104810093 A | 7/2015 |
| CN | 204926834 U | 12/2015 |
| CN | 105408965 A | 3/2016 |
| CN | 205069202 U | 3/2016 |
| JP | H01313807 A | 12/1989 |
| JP | 2001-093357 A | 4/2001 |
| JP | 2005-166402 A | 6/2005 |
| JP | 2005-166450 A | 6/2005 |
| JP | 2007535111 A | 11/2007 |
| JP | 2008041510 A | 2/2008 |
| JP | 2011-165575 A | 8/2011 |
| JP | 2014-220043 A | 11/2014 |
| JP | 2015138751 A | 7/2015 |
| JP | 2017-003762 A | 1/2017 |
| JP | 201776515 A | 4/2017 |
| JP | 2017097965 A | 6/2017 |
| KR | 1020150140512 A | 12/2015 |
| WO | 2016052506 A1 | 4/2016 |
| WO | 2016199765 A1 | 12/2016 |
| WO | 2017/109939 A1 | 6/2017 |

OTHER PUBLICATIONS

Aug. 7, 2018 International Preliminary Report on Patentability issued in International Patent Application No. PCT/JP2018/004237.
Mar. 6, 2018 International Search Report issued in International Patent Application No. PCT/JP2018/004237.
Jul. 30, 2021 Office Action issued in Chinese Patent Application No. 201880026549.4.
Jun. 23, 2020 Office Action issued in Japanese Patent Application No. 2017-090041.
Jun. 22, 2020 Office Action issued in Chinese Patent Application No. 201880026594.X.
Dec. 22, 2020 Decision of Refusal issued in Japanese Patent Application No. 2017-090040.
Dec. 22, 2020 Notice of Reasons for Refusal issued in Japanese Patent Application No. 2017-090041.
Jun. 2, 2020 Office Action issued in Chinese Patent Application No. 201880026549.4.
Jan. 7, 2021 Office Action issued in Chinese Patent Application No. 201880026594.X.
Jan. 19, 2021 Office Action issued in Chinese Patent Application No. 201880026549.4.
Jul. 30, 2021 Office Action issued in Chinese Patent Application No. 201880026594.X.
Jun. 14, 2022 Office Action issued in Japanese Patent Application No. 2021-095541.

* cited by examiner

COMPOSITE CABLE

CROSS REFERENCE

The present application is a Continuation of U.S. patent application Ser. No. 16/603,541 filed Oct. 7, 2019, which is a National Stage Entry of International Patent Application No. PCT/JP2018/004237 filed Feb. 7, 2018, which claims priority to Japanese Patent Application No. 2017-090040 filed Apr. 28, 2017. The content of each of the above identified applications is hereby incorporated by reference herein.

TECHNICAL FIELD

The present invention relates to a composite cable.

BACKGROUND ART

Conventionally in the field of vehicles such as automobiles, a composite cable with a multi-core structure as described in Patent Document 1, etc. has been known in which the outer circumference of a plurality of wires are covered with a sheath all together. In this type of composite cable, in order to prevent firm adhesion between the sheath and the wires, the outer circumference of the plurality of wires is covered all together with a separator formed of thin paper, and then is covered with the sheath in some cases.

PRIOR ART LITERATURE

Patent Document

Patent Document 1 JP-A-2005-166450

SUMMARY OF INVENTION

Problem to be Solved by the Invention

However, the conventional composite cable has the following problems. In a composite cable, in general, the sheath is peeled off with a blade cutting into the sheath at the time of peeling-off the cable end portion and/or the cable intermediate portion. However, in the case of the conventional composite cable, at the time of peeling off the sheath, dust of the thin paper as the separator covering the wires scatteringly falls off.

The present invention has been made in view of such a background, and it is intended to provide a composite cable that makes it easier to restrain the falling-off of separator dust at the time of peeling off the sheath, as compared with the conventional art.

Means for Solving the Problem

One aspect of the present invention is a composite cable including:

a plurality of wires;

a separator that covers the outer circumference of the plurality of wires all together;

a sheath that covers the outer circumference of the separator; and an inclusion that is interposed between the separator and the sheath, wherein the separator has a base layer composed of a polymer and an adhesive layer formed on the surface of the base layer on the inclusion side, and the adhesive layer adheres to the inclusion.

Effects of the Invention

In the composite cable, the inclusion is disposed between the separator and the sheath. Therefore, it is easy to form a cable cross section of the composite cable in a circular shape, and it is easy to set the depth of a blade cutting into the sheath uniform at the time of peeling-off the cable end portion and/or the cable intermediate portion. Hence, according to the above-mentioned composite cable, the peeling workability for the sheath can be improved. Further, in the composite cable, the separator has the base layer composed of a polymer, and the adhesive layer formed on the surface of the base layer on the inclusion side. The adhesive layer of the separator adheres to the inclusion. Therefore, when the sheath of the composite cable is peeled off, the separator sticks to the sheath and inclusion which have been peeled off, and is taken off together therewith. For this reason, in the composite cable, it is easy to remove the separator together with the sheath and the inclusion, and to restrain falling-off of dust of the separator in comparison with a composite cable using the separator made of thin paper.

MODES FOR CARRYING OUT THE INVENTION

Figure 1:
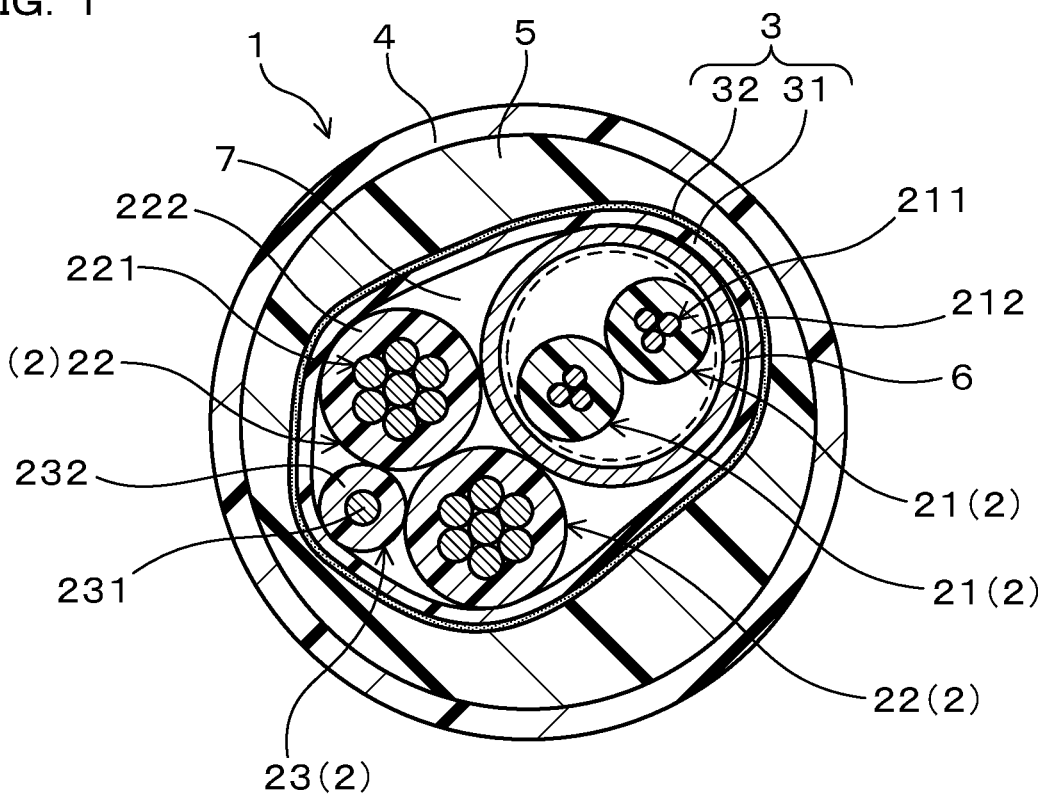
FIG. 1 is an illustration schematically showing a composite cable according to Embodiment 1 in a cross section perpendicular to the center axis of the cable.

In the composite cable, the separator has the base layer composed of a polymer, and the adhesive layer formed on the surface of the base layer on the inclusion side. As the polymer that constitutes the base layer, specifically, various types of resins may be used. More specifically, examples of the polymer can include polyester resins such as polyethylene terephthalate, vinyl chloride resins such as polyvinyl chloride, polyurethane resins, etc. As the polymer, polyester resins such as polyethylene terephthalate are preferably used from the viewpoints of being excellent in formability of the adhesive layer, being less likely to leave offcuts of the separator with largely different sizes, heat resistance, easy availability, and so on. Here, the polymer may include one or two or more kinds of additives such as a flame retardant, a filler, an antioxidant, etc. The thickness of the base layer may be specifically set preferably to 10 μm or more, more preferably to 15 μm or more, and still more preferably to 20 μm or more from the viewpoints of ensuring the strength of the separator, hardly leaving offcuts of the separator, and so on. The thickness of the base layer may be specifically set preferably to 200 μm or less, more preferably to 150 μm or less, still more preferably to 100 μm or less, and still more preferably to 50 μm or less from the viewpoints of easily increasing circularity of the cable, restraining a periodical unevenness on the surface of the cable, and so on.

The adhesive layer has adhesiveness to the inclusion and the base layer. It is noted that adhesion of the adhesive layer includes tacky adhesion. As a material constituting the adhesive layer, resins based on acrylic resins or elastomers, resins based on vinyl chloride-vinyl acetate copolymers, etc. may be specifically exemplified. One, or two or more kinds of these resins may be used singly or in combination. As the resins based on acrylic resins or elastomers, ethylene-vinyl acetate copolymer (EVA), ethylene-ethyl acrylate copolymer (EEA), SEBS, SBR, etc. may be exemplified. As a material constituting the adhesive layer, a resin based on ethylene-vinyl acetate copolymer (EVA), or vinyl chloride-vinyl acetate copolymer, etc. may be preferably used from the viewpoint that the separator is easily removed together with the sheath and the inclusion and falling-off of separator dust is easily restrained. It is noted that the adhesive layer may be formed by surface modification of the surface of the base layer. The thickness of the adhesive layer may be specifically set preferably to 1 μm or more, more preferably to 1.5 μm or more, and still more preferably to 2 μm or more from the viewpoints of ensuring the adhesiveness, restraining the adhesion peeling from the inclusion, and so on. The thickness of the adhesive layer may be set preferably to 30 μm or less, more preferably to 10 μm or less, and still more preferably to 5 μm or less from the viewpoints of easily restraining adhesion between the adhesive layer sticking out from the base layer and the wire, and so on.

As a material constituting the inclusion, polyolefin-based resins such as polyethylene, polypropylene, ethylene-vinyl acetate copolymer (EVA), ethylene-ethyl acrylate copolymer (EEA), ethylene-methyl acrylate copolymer (EMA), etc., vinyl chloride resins such as polyvinyl chloride, fluorine resins, silicone resins, polyurethane resins, etc. may be exemplified. One, or two or more kinds of these resins may be used singly, or in combination, and may be crosslinked as needed. Further, the inclusion may include one or two or more kinds of additives such as a flame retardant, a filler, an antioxidant, and the like.

In the composite cable, the plurality of wires may be specifically configured to include a plurality of signal lines and a plurality of power lines. The signal lines are wires for use in transmitting an electrical signal. The power lines are wires for use in supplying power, such as a power supply line. According to this configuration, it is possible to achieve a composite cable capable of restraining falling-off of dust of the separator at the time of peeling off the sheath and performing power supply and signal transmission/reception with a single cable.

The plurality of signal lines may be configured such that the plurality of signal lines includes at least one twisted pair wire composed of two signal lines twisted together, and the outer circumference of the twisted pair wire is covered with a shield conductor. In the composite cable, the signal lines are arranged near the power lines which generate electric noise. According to the above-mentioned configuration, the two signal lines are less likely to be affected by electric noise because they are twisted together. Further, according to the above-mentioned configuration, the twisted pair line is less likely to be affected by electric noise also because the twisted pair line is covered by the shield conductor. Therefore, according to the above-mentioned configuration, it is possible to achieve a composite cable capable of restraining falling-off of dust of the separator at the time of peeling off the sheath and excellent in noise countermeasures. In addition, according to the above-mentioned configuration, because not the power lines having outer diameters easily made larger than those of the signal lines but the twisted pair line is covered with the shield conductor, the outline when the wires are covered with the separator is easily made perfectly circular. Thus, the outer diameter when the after-mentioned inclusion has been formed on the outer circumference of the separator can be easily made small. For this reason, the above-mentioned configuration makes it easy to achieve a composite cable the diameter of which is circular and is easily reduced. Here, differently from this configuration, i.e., in the case where the power lines are covered with the shield conductor, the outline when the wires are covered with the separator is likely to be elliptically shaped. Therefore, it becomes necessary to surely provide the minimum thickness in the major axis direction of the ellipse to the inclusion that covers the outer circumference part of the separator. Thus, in this case, when the cable is formed circular by the inclusion, the percentage of the inclusion is made large, so that the outer diameter including the inclusion is larger. Thus, this case is not preferred from the viewpoint of reducing the diameter of the composite cable.

As the shield conductor, a braided wire, a metal element wire, a metallic foil body, etc. may be specifically exemplified. The shield conductor, more specifically, may be composed of the metal element wire that covers the outer circumference of the twisted pair line with spirally winding around the outer circumference. This configuration makes it possible to achieve a composite cable that is capable of restraining falling-off of dust of the separator at the time of peeling off the sheath and is excellent in durability of the shield conductor against repeated bending by shaking movement of the cable in comparison with the case of using the braided wire.

In the composite cable, the plurality of wires may include a ground wire in addition to the plurality of signal lines and the plurality of power lines. According to this configuration, it is possible to achieve a composite cable that is capable of restraining falling-off of dust of the separator at the time of peeling off the sheath and performing power supply, signal transmission/reception, and grounding with a single cable. Moreover, according to this configuration, the separator and the ground wire do not stick to each other even when the ground wire is disposed so as to be in contact with the surface of the base layer of the separator on the wire side. Therefore, according to this configuration, because the ground wire with relatively low strength does not stick to the separator and is not pulled at the time of peeling off the sheath, a composite cable in which the joined ground wire is hardly broken can be achieved. In addition, in a conventional composite cable using a separator made of thin paper, the thin paper may stick to the ground wire in some cases. This is considered because part of the material constituting the inclusion permeates the thin paper when manufacturing the cable. Therefore, in the case of the conventional composite cable, there is a risk that the ground wire may stick to the thin paper and get pulled at the time of peeling off the sheath, and the ground wire may be cut.

In the above-mentioned composite cable, according to the configuration in which the outer circumference of the twisted pair line is covered with the shield conductor and the ground wire is provided, even in the case where the shield conductor can be grounded at one end side of the composite cable but can be hardly grounded at the other end side of the composite cable, the composite cable can be used in such a manner that the shield conductor is connected to the ground wire at the other end side of the composite cable, and the ground wire is grounded at the one end side of the composite cable. Thus, the above-mentioned configuration achieves a composite cable that is suitable for use under vehicle conditions in which grounding of the composite cable at one end side thereof is restricted. For example, a composite cable can be achieved, which is particularly suitable for the underbody part (chassis) of a vehicle such as an electric parking brake, an electric brake, etc. that are limited in grounding on the wheel side as later described.

In the composite cable, the ground wire may be configured to be isolated from the plurality of signal lines with the plurality of power lines interposed therebetween. The ground wire is a wire that has a property to easily generate electric noise. According to this configuration, a physical distance between the ground wire and the signal lines can be ensured by interposing the plurality of power lines therebetween thereby to achieve a composite cable that is excellent in noise countermeasure. As described above, when the outer circumference of the signal lines is covered with the shield conductor, not only noise reduction effects brought about by the shield conductor but also noise reduction effects brought about by the above-mentioned arrangement of the power lines, the ground wire, and the signal lines, can be obtained, so that a composite cable that is further excellent in noise countermeasure can be achieved.

In the composite cable, the plurality of power lines may be configured to include at least two power lines. In this configuration, it is made possible to dispose the signal lines on one side from a connecting line between the central axes of the power lines and to dispose the ground wire on the other side from the connecting line when viewed in the cable cross section by arranging the two power lines in contact with each other. Therefore, according to this configuration, at least two power lines serve as a partition so that the ground wire and the plurality of signal lines can be disposed isolatedly from each other with no contact, and thus, there is an advantage that the above-mentioned operational effects can be easily exhibited. More specifically, the ground wire can be disposed in a space enclosed by part of the surfaces of the plurality of power lines and part of the inner circumference of the separator. In this case, the above-mentioned operational effects can be obtained more surely.

In the composite cable, each of the signal lines, the power lines, and the ground wire may be specifically configured to include a conductor and an insulator that covers the outer circumference of the conductor. Further, in the composite cable, each outer diameter of the power lines and the ground wire may be specifically configured to meet the relation of, for example, the outer diameter of the ground wire<the outer diameter of the power line. According to this configuration, a composite cable having the ground wire easily blocked by the power lines and hardly displaced to the twisted pair line side can be achieved.

In the composite cable, as a material constituting the sheath, a polyurethane resin, a vinyl chloride resin, etc. may be exemplified. As the material constituting the sheath, a polyurethane resin can be preferably used from the viewpoint of anti-damage property, abrasion resistance, and the like.

It is noted that for the purposes of adjusting the shape of the cable, and so on, the composite cable may have an inclusion inside the separator to be disposed in a gap (space) that can be formed inside the separator. As the inclusion inside the separator, threads (cotton threads, etc.), cords (resin cords such as polypropylene cords, corded paper, etc.), rod-like members (resin rods such as polyethylene terephthalate resin rods, etc.) may be exemplified. These may be used in one kind, or two or more kinds in combination.

The composite cable may be used, for example, in a vehicle such as an automobile, and more specifically, may be preferably used for the underbody (chassis) of a vehicle such as an electric parking brake or an electric brake. This configuration makes it possible to achieve a composite cable for use in the underbody (chassis) of a vehicle such as an electric parking brake or an electric brake, which is excellent in peeling workability for the sheath and is capable of restraining falling-off of dust of the separator. In the composite cable, the power lines may be used, for example, to supply an electric power required for driving a motor and to supply an electric power required for various in-vehicle devices. In addition, the signal lines may be used for various in-vehicle network communications such as transmission of an electric signal concerning control of the motor, transmission of an electric signal concerning the rotation velocity of a vehicle wheel, transmission of an electric signal of a sensor for detecting/collecting the conditions of the vehicle by a sensor mounted on the vehicle wheel and the vicinity of the vehicle wheel, vehicle control signal communication, and so on.

It is noted that the above-mentioned configurations may be arbitrarily combined with each other as needed for the purposes of obtaining the operational effects as mentioned above, and so on.

EMBODIMENTS

Hereinafter, embodiments of the composite cable will be described with reference to the drawings. It is noted that the same components will be illustrated with the same reference numbers.

Embodiment 1

A composite cable of Embodiment 1 will be described with reference to FIG. 1. As shown in FIG. 1, a composite cable 1 of the present embodiment includes a plurality of wires 2, a separator 3 that covers the outer circumference of the plurality of wires 2 all together, a sheath 4 that covers the outer circumference of the separator 3, and an inclusion 5 that is interposed between the separator 3 and the sheath 4. The separator 3 has a base layer 31 composed of a polymer and an adhesive layer 32 formed on the surface of the base layer 31 on the inclusion 5 side. In the composite cable 1, the adhesive layer 32 adheres to the inclusion 5. The details will be described below.

In the present embodiment, the plurality of wires 2 includes a plurality of signal lines 21, a plurality of power lines 22, and a ground wire 23. The plurality of wires 2 is composed of the plurality of signal lines 21, the plurality of power lines 22, and the ground wire 23 which are twisted together as a unit. FIG. 1 shows an example in which the plurality of wires 2 is made up of two signal lines 21, two power lines 22 and one ground wire 23. The two signal lines 21 are configured as a twisted pair line by twisting together with each other. The outer circumference of the twisted pair line is covered with a shield conductor 6. It is noted that, in FIG. 1, the dotted line surrounding the two signal lines 21 indicates the outer diameter of the twisted pair line. In addition, the ground wire 23 is isolated from the twisted pair line composed of the two signal lines 21 with the two power lines 22 interposed therebetween. Therefore, the ground wire 23 is not in contact with the two signal lines 21. And, the ground wire 23 is arranged so as to be in contact with the separator 3. Here, a gap 7 is formed between the plurality of wires 2 and the separator 3.

In the present embodiment, each signal line 21 includes conductors 211 and an insulator 212 that covers the outer circumference of the conductors 211. Each conductor 211 is composed of a stranded wire conductor formed by twisting a plurality of child stranded wires formed of a plurality of metal element wires twisted together. The metal element wires may be formed of, for example, copper or a copper alloy, or aluminum or an aluminum alloy. The insulator 212 may be formed of, for example, cross-linked polyethylene (PE) or the like.

In the present embodiment, the shield conductor 6 is composed of a metal element wire that covers the outer circumference of the twisted pair line by spirally winding therearound. The metal element wire may be formed of, for example, copper or a copper alloy, or aluminum or an aluminum alloy.

In the present embodiment, each power line 22 includes conductors 221 and an insulator 222 that covers the outer circumference of the conductors 221. Each conductor 221 is composed of a stranded wire conductor formed by twisting a plurality of child stranded wires formed of a plurality of metal element wires twisted together. The metal element wires may be formed of, for example, copper or a copper alloy, or aluminum or an aluminum alloy. The insulator 222 may be formed of, for example, cross-linked polyethylene (PE) or the like.

In the present embodiment, the ground wire 23 includes a conductor 231 and an insulator 232 that covers the outer circumference of the conductor 231. The conductor 231 is composed of a stranded wire conductor formed by twisting a plurality of metal element wires. The metal element wires may be formed of, for example, copper or a copper alloy, or aluminum or an aluminum alloy. The insulator 232 is formed of, for example, cross-linked polyethylene (PE) or the like.

In the present embodiment, the base layer 31 of the separator 3 may be formed of, for example, a polyethylene terephthalate (PET) or the like. The adhesive layer 32 of the separator 3 may be formed of, for example, an ethylene-vinyl acetate copolymer (EVA) or the like.

In the present embodiment, the inclusion 5 may be formed of, for example, cross-linked polyethylene (PE).

In the present embodiment, the sheath 4 may be formed of, for example, a polyurethane resin (PU) or the like.

Next, operational effects of the composite cable according to the present embodiment will be described.

In the composite cable 1 of the present embodiment, the inclusion 5 is disposed between the separator 3 and the sheath 4. Therefore, the cross section of the composite cable 1 can be easily formed in a circular shape, and the depth of a blade cutting into the sheath can be easily set uniform at the time of peeling-off the cable end portion and/or the cable intermediate portion. Thus, the composite cable 1 of the present embodiment makes it possible to improve peeling-off workability for the sheath 4. In the composite cable 1 of the present embodiment, the separator 3 has the base layer 31 composed of a polymer, and the adhesive layer 32 formed on the surface of the base layer 31 on the inclusion 5 side. The adhesive layer 32 of the separator 3 adheres to the inclusion 5. Therefore, when the sheath of the composite cable 1 of the present embodiment is peeled off, the separator 3 sticks to the sheath 4 and inclusion 5 which have been peeled off, and is taken off together therewith. Thus, in the composite cable 1 of the present embodiment, it is easy to remove the separator 3 together with the sheath 4 and the inclusion 5, and to restrain falling-off of dust of the separator in comparison with a composite cable using the separator made of thin paper.

Embodiment 2

Figure 2:
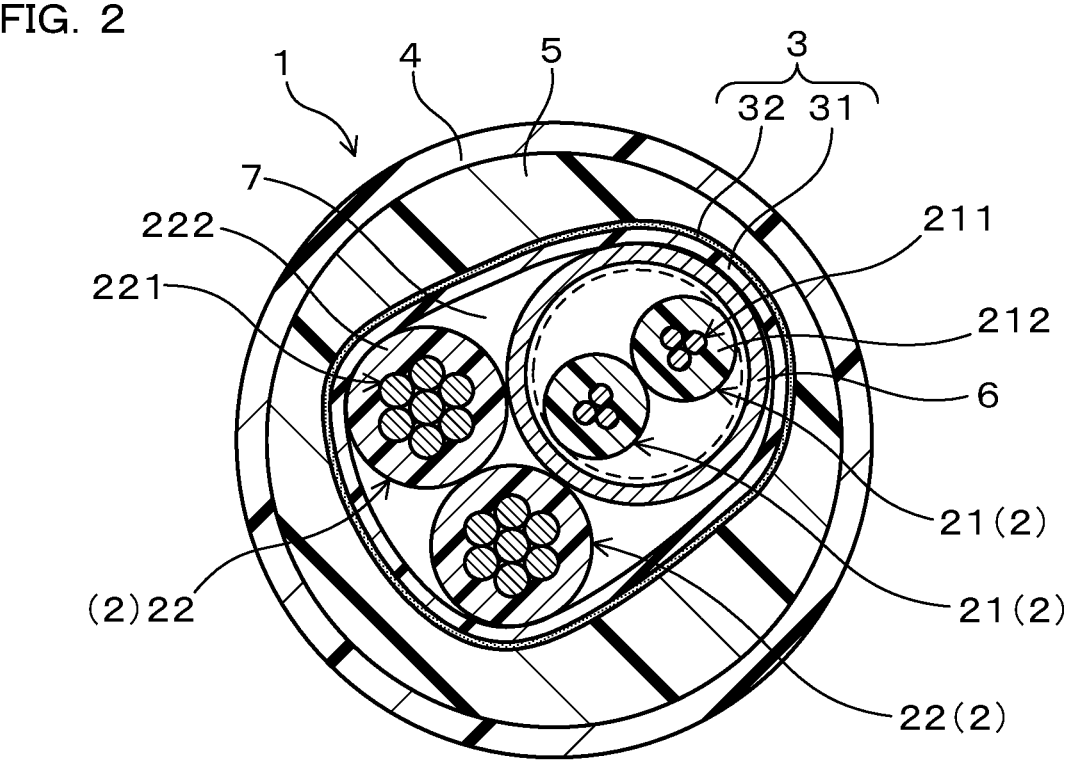
FIG. 2 is an illustration schematically showing a composite cable according to Embodiment 2 in a cross section perpendicular to the center axis of the cable.

A composite cable of Embodiment 2 will be described with reference to FIG. 2. In a composite cable 1 of the present embodiment, a plurality of wires 2 includes a plurality of signal lines 21 and a plurality of power lines 22, and does not include a ground wire 23. FIG. 2 shows specifically an example in which the plurality of wires 2 are made up of two signal lines 21 and two power lines 22. The other configurations are the same as those in Embodiment 1.

The same operational effects as those in Embodiment 1 can be obtained by the composite cable 1 of the present embodiment.

Embodiment 3

A composite cable of Embodiment 3 will be described with reference to FIG. 3. In a composite cable 1 of the present embodiment, a shield conductor 6 is not provided on the outer circumference of the twisted pair line that is composed of the two signal lines 21. The other configurations are the same as those in Embodiment 2.

The same operational effects as those in Embodiment 1 can be obtained by the composite cable 1 of the present embodiment.

Embodiment 4

Figure 4:
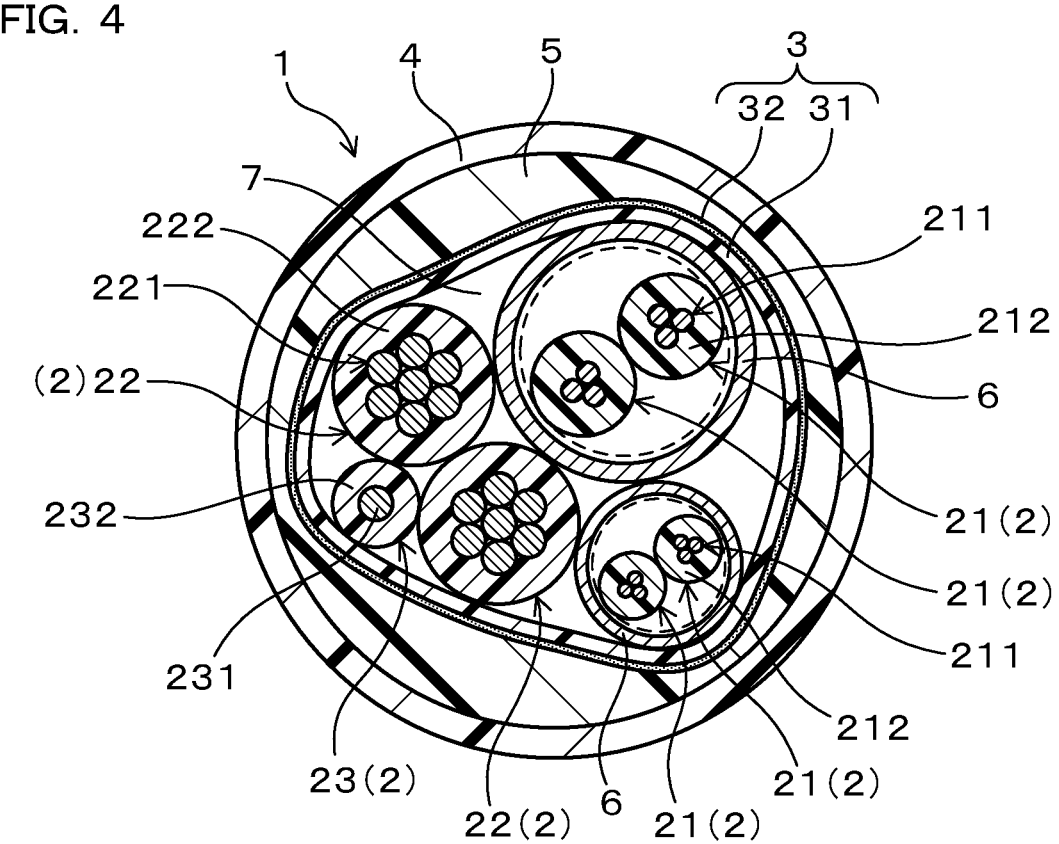
FIG. 4 is an illustration schematically showing a composite cable according to Embodiment 4 in a cross section perpendicular to the center axis of the cable.

A composite cable of Example 4 will be described with reference to FIG. 4. In a composite cable 1 of the present embodiment, a plurality of wires 2 includes two twisted pair lines each composed of two signal lines 21 twisted together. FIG. 4 specifically shows an example in which the plurality of wires 2 includes four signal lines 21, two power lines 22, and one ground wire 23. Two signal lines 21 among the four signal lines 21 are twisted together to form a twisted pair line, and the other two signal lines 21 are also twisted together to form another twisted pair line. Each twisted pair line has the outer circumference covered with a shield conductor 6. Here, the ground wire 23 is isolated from each twisted pair line with the power lines 22 interposed therebetween.

In the present embodiment, the shield conductor 6 is composed of a braided wire. The braided wire is formed of a plurality of metal element wires braided together. The metal element wires may be formed of, for example, copper or a copper alloy, or aluminum or an aluminum alloy. The other configurations are the same as those in Embodiment 1.

The same operational effects as those in Embodiment 1 can be obtained by the composite cable 1 of the present embodiment.

EXPERIMENTAL EXAMPLE

Hereinafter, the composite cable will be more specifically described with reference to an experimental example.

Experimental Example 1

Composite cables configured as shown in Table 1 were prepared.

—Sample 1, Sample 2—

One twisted pair line having the outer circumference covered with a shield conductor, two power lines, and one ground wire were twisted together so as to form a core wire structure as shown in FIG. 1. And then, the outer circumference of the core wire was covered by a separator. Here, the separator was provided such that the adhesive layer was set to be an outer circumference. Then, by extrusion molding, the outer circumference of the separator was covered by an inclusion extruded thereon circularly. Then, by extrusion molding, the outer circumference of the inclusion was covered by a sheath extruded thereon. Thus, the composite cables of Sample 1 and Sample 2 were obtained.

—Sample 3, Sample 4—

One twisted pair line having the outer circumference covered with a shield conductor, and two power lines were twisted together so as to form a core wire structure as shown in FIG. 2. And then, the outer circumference of the core wire was covered by a separator. Here, the separator was provided such that the adhesive layer was set to be an outer circumference. Then, by extrusion molding, the outer circumference of the separator was covered by an inclusion extruded thereon circularly. Then, by extrusion molding, the outer circumference of the inclusion was covered by a sheath extruded thereon. Thus, the composite cables of Sample 3 and Sample 4 were obtained.

—Sample 5, Sample 6—

Figure 3:
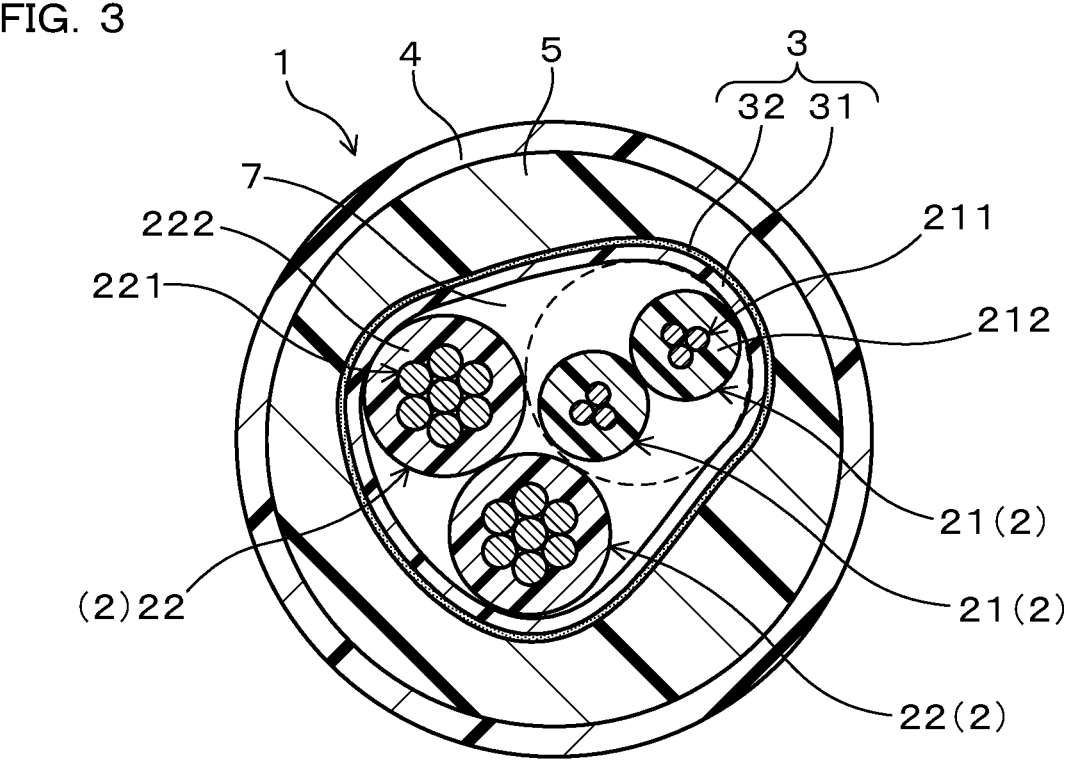
FIG. 3 is an illustration schematically showing a composite cable according to Embodiment 3 in a cross section perpendicular to the center axis of the cable.

One twisted pair line having the outer circumference not covered with a shield conductor, and two power lines were twisted together so as to form a core wire structure as shown in FIG. 3. And then, the outer circumference of the core wire was covered by a separator. Here, the separator was provided such that the adhesive layer was set to be an outer circumference. Then, by extrusion molding, the outer circumference of the separator was covered by an inclusion extruded thereon circularly. Then, by extrusion molding, the outer circumference of the inclusion was covered by a sheath extruded thereon. Thus, the composite cables of Sample 5 and Sample 6 were obtained.

TABLE 1

| | | | Sample 1 | Sample 2 | Sample 3 | Sample 4 | Sample 5 | Sample 6 |
|---|---|---|---|---|---|---|---|---|
| | Cross-sectional Structure of Cable | | FIG. 1 | FIG. 1 | FIG. 2 | FIG. 2 | FIG. 3 | FIG. 3 |
| Power Line | Conductor | Configuration Number/Number/mm | 7/72/0.08 | 7/72/0.08 | 7/72/0.08 | 7/72/0.08 | 7/72/0.08 | 7/72/0.08 |
| | | Type of Element Wire | Copper Alloy Wire | Copper Alloy Wire | Copper Alloy Wire | Copper Alloy Wire | Copper Alloy Wire | Copper Alloy Wire |
| | | Size mm² | 2.5 | 2.5 | 2.5 | 2.5 | 2.5 | 2.5 |
| | | Outer Diameter mm | Approximately 2.4 | Approximately 2.4 | Approximately 2.4 | Approximately 2.4 | Approximately 2.4 | Approximately 2.4 |
| | Insulator | Material | Flame-retardant Crosslinked PE | Flame-retardant Crosslinked PE | Flame-retardant Crosslinked PE | Flame-retardant Crosslinked PE | Flame-retardant Crosslinked PE | Flame-retardant Crosslinked PE |
| | | Outer Diameter mm | 3.2 | 3.2 | 3.2 | 3.2 | 3.2 | 3.2 |
| Signal Line | Conductor | Configuration Number/Number/mm | 3/16/0.08 | 3/16/0.08 | 3/16/0.08 | 3/16/0.08 | 3/16/0.08 | 3/16/0.08 |
| | | Type of Element Wire | Copper Alloy Wire | Copper Alloy Wire | Copper Alloy Wire | Copper Alloy Wire | Copper Alloy Wire | Copper Alloy Wire |
| | | Size mm² | 0.25 | 0.25 | 0.25 | 0.25 | 0.25 | 0.25 |
| | | Outer Diameter mm | Approximately 0.8 | Approximately 0.8 | Approximately 0.8 | Approximately 0.8 | Approximately 0.8 | Approximately 0.8 |
| | Insulator | Material | Flame-retardant Crosslinked PE | Flame-retardant Crosslinked PE | Flame-retardant Crosslinked PE | Flame-retardant Crosslinked PE | Flame-retardant Crosslinked PE | Flame-retardant Crosslinked PE |
| | | Outer Diameter mm | 2.2 | 2.2 | 2.2 | 2.2 | 2.2 | 2.2 |
| | Stranding | Core Number Core | 2 | 2 | 2 | 2 | 2 | 2 |
| | | Outer Diameter mm | 4.4 | 4.4 | 4.4 | 4.4 | 4.4 | 4.4 |
| | Shield | Form | Spirally-wound Copper Alloy | Braided Copper Alloy | Spirally-wound Copper Alloy | Braided Copper Alloy | — | — |
| | | Outer Diameter mm | Approximately 4.6 | Approximately 4.9 | Approximately 4.6 | Approximately 4.9 | — | — |
| Ground Wire | Conductor | Configuration Number/mm | 60/0.08 | 60/0.08 | — | — | — | — |
| | | Type of Element Wire | Copper Alloy Wire | Copper Alloy Wire | | | | |
| | | Size mm² | 0.3 | 0.3 | | | | |
| | | Outer Diameter mm | Approximately 0.7 | Approximately 0.7 | | | | |
| | Insulator | Material | Flame-retardant Crosslinked PE | Flame-retardant Crosslinked PE | | | | |
| | | Outer Diameter mm | 1.45 | 1.45 | | | | |

TABLE 1-continued

|  |  |  | Sample 1 | Sample 2 | Sample 3 | Sample 4 | Sample 5 | Sample 6 |
|---|---|---|---|---|---|---|---|---|
| Separator | Base Layer | Material | PET | PET | PET | PET | PET | PET |
|  |  | Thickness μm | 10 | 20 | 25 | 50 | 25 | 100 |
|  | Adhesive Layer | Material | EVA | EVA | EVA | EVA | EVA | EVA |
|  |  | Thickness μm | 1 | 3 | 3 | 10 | 5 | 30 |
| Inclusion |  | Material | Crosslinked PE | Crosslinked PE | Crosslinked PE | Crosslinked PE | Crosslinked PE | Crosslinked PE |
|  |  | Outer Diameter mm | 10.3 | 10.7 | 10.4 | 10.7 | 10.2 | 10.4 |
| Sheath |  | Material | Flame-retardant Crosslinked PU | Flame-retardant Crosslinked PU | Flame-retardant Crosslinked PU | Flame-retardant Crosslinked PU | Flame-retardant Crosslinked PU | Flame-retardant Crosslinked PU |
|  |  | Outer Diameter mm | 11.5 | 11.9 | 11.6 | 11.9 | 11.4 | 11.6 |

(Note 1)
"Number/Number/mm" means "Number of child stranded wires in a stranded wire/Number of element wires in a child stranded wire/Diameter of an element wire (mm)". "Number/mm" means "Number of element wires in a stranded wire/Diameter of an element wire (mm)".

Next, as a representative for the composite cables of Samples 1 to 6, the composite cable of Sample 1 was adopted. Then, 30 composite cables of Sample 1 were prepared. In addition, further 30 composite cables were prepared as comparative samples in the same manner as in Sample 1 except that the separator was made of pulp paper with a thickness of 0.05 mm.

For each sample cable, a cable cut-off test and a sheath peel-off test were conducted using a fully automatic wire cutting and peeling machine ("Casting C377A" manufactured by KODERA Electronic Co., Ltd.). The standard value of cable cutting length was set to 1000 mm, and sheath peeling-off length was set to 35 mm and 40 mm as two conditions. The results are shown in Table 2.

TABLE 2

|  |  | Cable Cutting Length (mm) | Sheath Peeling-off Length (mm) | Sheath Peeling-off Length (mm) |
|---|---|---|---|---|
| Condition |  | 1000 | 35 | 40 |
| Upper Limit |  | 1002 | 37 | 42 |
| Lower Limit |  | 998 | 33 | 38 |
| Test No. | 1 | 1000 | 35 | 40 |
|  | 2 | 999 | 36 | 41 |
|  | 3 | 1001 | 36 | 40 |
|  | 4 | 1000 | 36 | 40 |
|  | 5 | 1000 | 36 | 40 |
|  | 6 | 1000 | 36 | 40 |
|  | 7 | 1000 | 36 | 41 |
|  | 8 | 1000 | 36 | 40 |
|  | 9 | 1001 | 36 | 40 |
|  | 10 | 1001 | 35 | 40 |
|  | 11 | 1001 | 36 | 40 |
|  | 12 | 1001 | 36 | 40 |
|  | 13 | 1000 | 36 | 40 |
|  | 14 | 1001 | 36 | 40 |
|  | 15 | 1001 | 36 | 40 |
|  | 16 | 1000 | 35 | 40 |
|  | 17 | 1000 | 36 | 40 |
|  | 18 | 1000 | 36 | 40 |
|  | 19 | 1000 | 35 | 41 |
|  | 20 | 1000 | 36 | 40 |
|  | 21 | 999 | 35 | 40 |
|  | 22 | 1001 | 36 | 40 |
|  | 23 | 1000 | 36 | 41 |
|  | 24 | 1000 | 36 | 40 |
|  | 25 | 1000 | 36 | 40 |
|  | 26 | 1000 | 36 | 40 |
|  | 27 | 1001 | 36 | 41 |
|  | 28 | 1000 | 36 | 41 |
|  | 29 | 1001 | 35 | 40 |
|  | 30 | 1000 | 35 | 40 |
| Average Value |  | 1000 | 35.8 | 40.2 |
| Maximum Value |  | 1001 | 36 | 41 |
| Minimum Value |  | 999 | 35 | 40 |

As shown in the results of Table 2, it was confirmed that the cable cutting length and the sheath peeling-off length were not adversely affected by the configuration in which the separator is constituted of the base layer and the adhesive layer.

Next, a generation degree of the separator dust and a generation degree of cut-off piece residue of the separator in the above-mentioned tests were checked.

As the result, the number of the composite cables as the comparative samples in which separator dust (paper dust in the present example) was generated was 30 out of a total of 30. By contrast, the number of the composite cables of Sample 1 in which separator dust was generated was 0 out of a total of 30. This result revealed that falling-off of the separator dust generated at the time of peeling off the sheath can be restrained more easily by constituting the separator by the base layer composed of a polymer and the adhesive layer formed on the surface of the base layer on the inclusion side, as compared with the conventional arts. This is because when the sheath was peeled off, the separator stuck to the sheath and inclusion, which had been peeled off, and was taken off together therewith, so that the separator could be removed together with the sheath and the inclusion.

Meanwhile, the number of the composite cables as the comparative samples in which residue of the cut-off separator pieces was generated was 16 out of a total of 30. By contrast, the number of the composite cables of Sample 1 in which residue of the cut-off separator pieces was generated was 14 out of a total of 30. Moreover, as for the shape of the cut-off separator piece(s), uneven cut-off pieces of various sizes were found in the composite cables as the comparative samples. By contrast, in the composite cables of Sample 1, the cut-off pieces of the separator have the size of 2 to 3 mm at most, which was in the allowable range in a mass-production process. Furthermore, in the composite cables of Sample 1, it was confirmed that the cut-off pieces of the separator could be removed at the time of removing the sheath. These results revealed that the separator constituted by the base layer and the adhesive layer could easily avoid leaving various size of cut-off pieces, which would occur in the case of the separator composed of papers.

Also in the case where the thickness of the base layer was set in the range of 10 to 200 μm and the thickness of the adhesive layer was set in the range of 1 to 50 μm in the configuration of the composite cable of Sample 1, the same results were obtained. It is noted that when the thickness of the base layer was less than the above-mentioned range, the base layer is likely to be broken to thereby deteriorate productivity. In addition, the end(s) of the separator was/were shredded in some cases. When the thickness of the base layer was larger than the above-mentioned range, the winding diameter became larger owing to the reaction force of the separator, and there was found the tendency that the circularity of the cable would be reduced. Moreover, in some cases, periodical unevenness occurred on the surface of the cable. When the thickness of the adhesive layer was thinner than the above-mentioned range, there was found the tendency that the adhesion peeling of the adhesive layer from the inclusion would occur. When the thickness of the adhesive layer was larger than the above-mentioned range, there was found the tendency that the adhesive layer would be stuck out of the base layer and adhered to the wire to thereby deteriorate the processability. Thus, it was confirmed that the thickness of the base layer and the thickness of the adhesive layer are preferably set within the above-mentioned range for these reasons.

As mentioned above, although the embodiments of the present invention have been described in detail, the present invention is not limited to the above-mentioned embodiments and experimental examples, and various modifications can be made within the scope that does not depart from the spirit of the present invention.

The invention claimed is:
1. A composite cable comprising:
    a plurality of wires including:
        (i) a twisted pair of first coated wires,
        (ii) two second coated wires having a cross-sectional area larger than a cross-sectional area of the first coated wires, and
        (iii) a third coated wire having a cross-sectional area smaller than the cross-sectional area of the second coated wires;

a separator that covers an outer circumference of the plurality of wires all together, with a proviso that an outer peripheral surface of the plurality of wires is partially in contact with the separator, and the separator is arranged to have a non-circular cross-sectional shape;

a sheath that covers an outer circumference of the separator and is arranged to have a cross-sectional shape that is closer to a perfect circle than the non-circular cross-sectional shape of the separator; and an inclusion that is interposed between the separator and the sheath, wherein:

an imaginary line passing through centers of the two second coated wires arranged in contact with each other does not pass through a center of a cross section of the sheath;

an outer peripheral surface of the inclusion extends along an inner peripheral surface of the sheath, and has a cross-sectional shape that is closer to a perfect circle than the non-circular cross-sectional shape of the separator; and an inner peripheral surface of the inclusion abuts and extends along an outer peripheral surface of the separator, and has a non-circular cross-sectional shape corresponding to the non-circular cross-sectional shape of the separator.

2. The composite cable according to claim 1, wherein:

on one side of the imaginary line, only the twisted pair of the first coated wires is arranged as a wire other than the two second coated wires, and on the other side of the imaginary wire, only the third coated wire is arranged as a wire other than the two second coated wires.

3. The composite cable according to claim 1, wherein in a cross section of the composite cable, a wire through which the imaginary line passes is only the two second coated wires.

4. The composite cable according to claim 1, wherein a width of a space inside the separator in a direction along the imaginary line is smaller than that of a space inside the separator in a direction intersecting the imaginary line.

5. The composite cable according to claim 1, wherein the cross-sectional area of the third coated wire is smaller than the cross-sectional area of the first coated wires.

6. The composite cable according to claim 1, wherein an outer circumference of the twisted pair of the first coated wires is covered with a shield conductor.

7. The composite cable according to claim 1, wherein the third coated wire is in contact with the two second coated wires and is not in contact with the twisted pair of the first coated wires.

8. The composite cable according to claim 1, wherein:

the first coated wires are signal lines, the two second coated wires are power lines, and the third coated wire is a ground wire.

9. The composite cable according to claim 1, wherein a gap is formed between the separator and the plurality of wires.

\* \* \* \* \*